Nov. 23, 1965 HO CHOW 3,218,894
CUTTING ROLLED THERMOPLASTIC SHEET
Original Filed Jan. 23, 1957 3 Sheets-Sheet 2
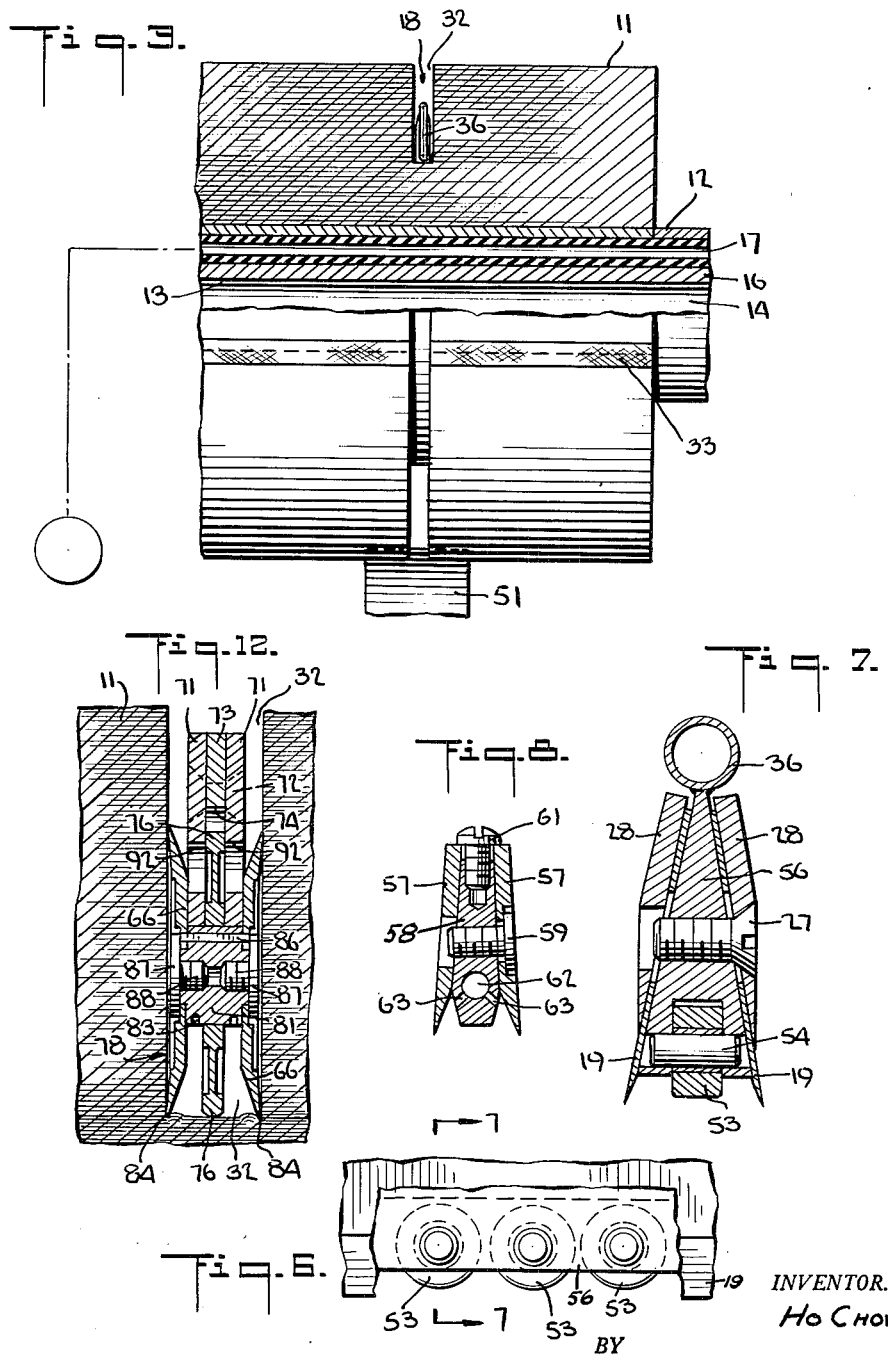
INVENTOR.
Ho Chow
BY
F. Kleso + A. Sheffer
ATTORNEYS Nov. 23, 1965  HO CHOW  3,218,894
CUTTING ROLLED THERMOPLASTIC SHEET
Original Filed Jan. 23, 1957  3 Sheets-Sheet 3
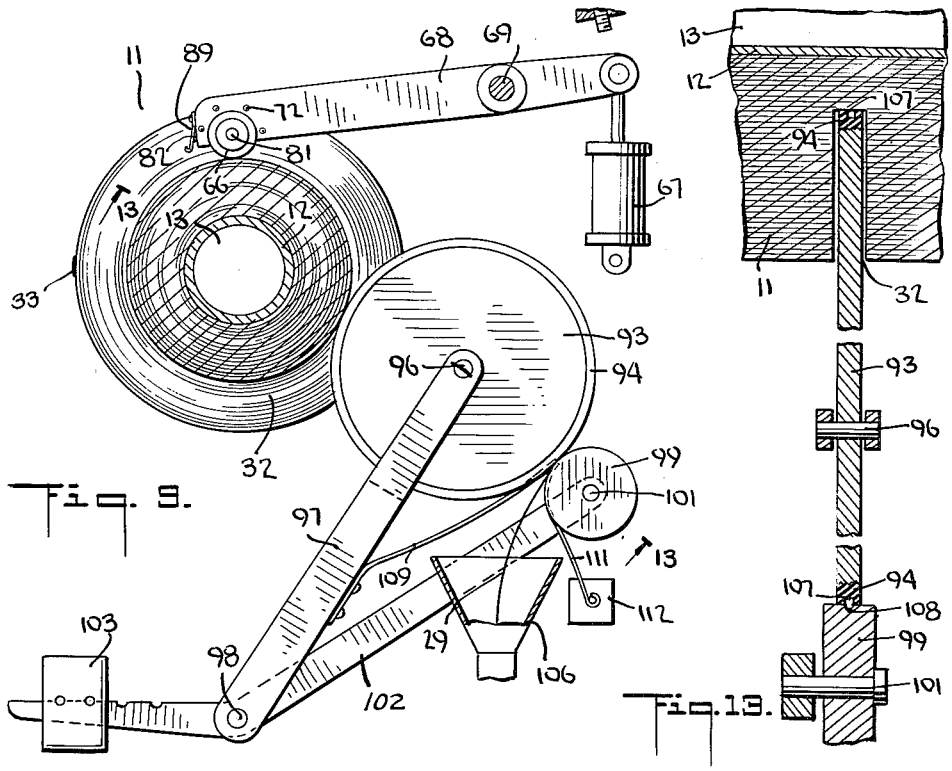
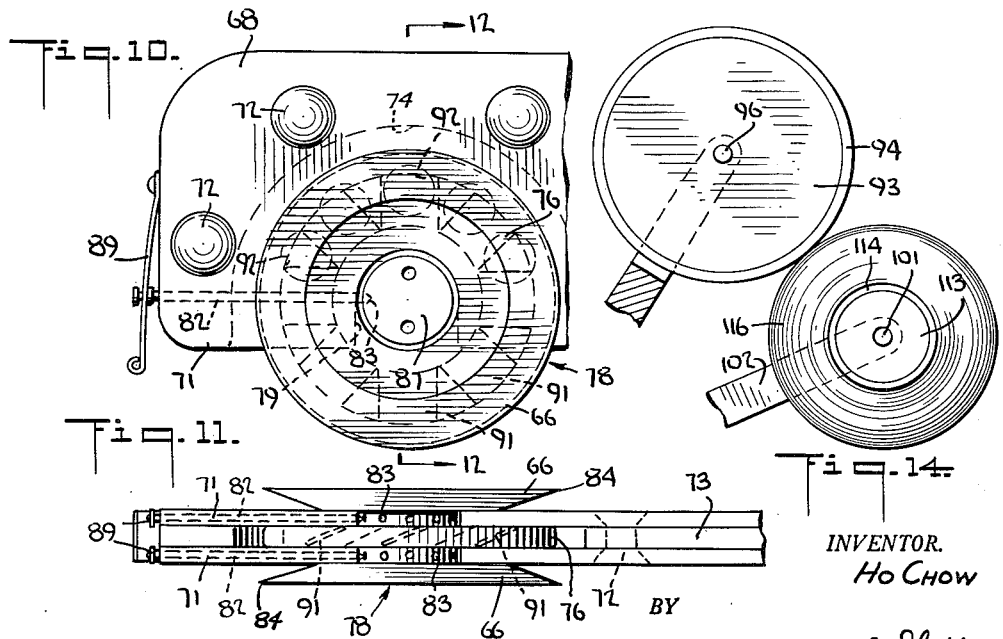
INVENTOR.
Ho Chow
BY
F. Klaas & O. Sheffer
ATTORNEYS United States Patent Office 3,218,894
Patented Nov. 23, 1965

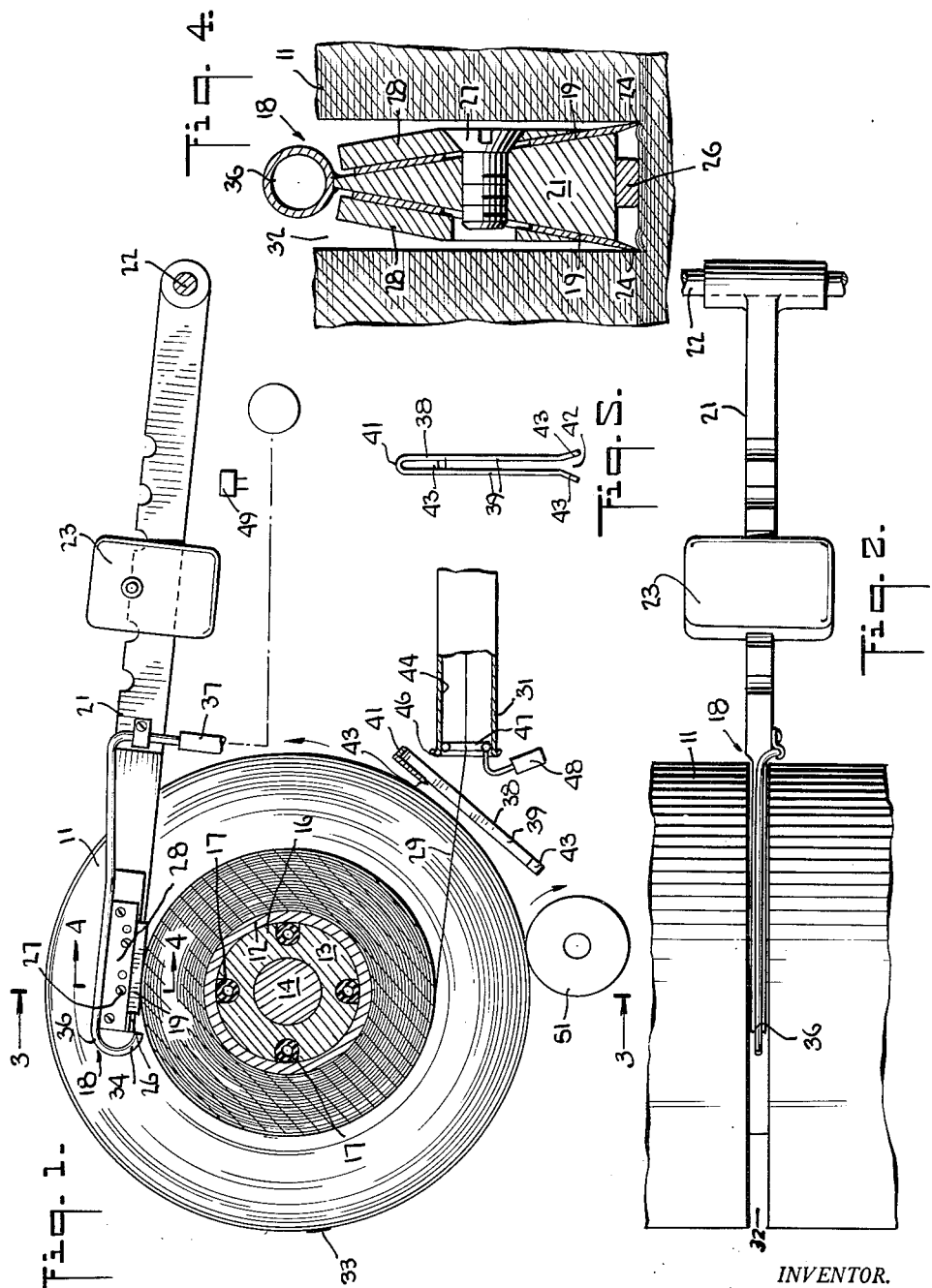

1

3,218,894
CUTTING ROLLED THERMOPLASTIC SHEET
Ho Chow, Yonkers, N.Y., assignor to Celanese Corporation of America, New York, N.Y., a corporation of Delaware
Continuation of application Ser. No. 635,687, Jan. 23, 1957. This application May 6, 1963, Ser. No. 283,132
2 Claims. (Cl. 82—101)

This application is a continuation of my application Serial No. 635,687, filed January 23, 1957.

This invention relates to the cutting of rolls of sheet material, such as rolls of film of thermoplastic polymeric material.

It is common to produce sheet material in continuous lengths and relatively wide widths and to wind the material onto cores to form rolls. The wound sheet material is often much wider than is desired for many purposes and must therefore be slit lengthwise into narrower widths. Conventionally, such slitting has been carried out by unwinding the original roll, slitting the travelling unwound material lengthwise, and rewinding the slit material on short cores to form the desired individual narrower rolls. This is an expensive and time-consuming process. For example, in setting up the slitting operation considerable time and attention is required for threading the sheet material, matching the ends of the short cores with the slit edges of the sheet material, taping the ends of the slit sheet material to the short cores to start the rewinding, adjusting tensions in the moving webs, and handling the multiple wind-up shafts. Additionally, it is difficult to control the rewinding operation to insure that the edges of the individual rolls will be smooth and square and that these rolls will be wound to the proper degree of hardness and flatness.

It is therefore an important aim of this invention to provide an improved process and apparatus for cutting sheet material which will be free of the foregoing disadvantages.

Another object of this invention is the provision of a novel process and apparatus for slitting wide rolls of sheet material, particularly of thermoplastic polymeric sheet material, to form a plurality of narrower rolls directly without rewinding.

Other objects and advantages of this invention will become apparent from the following detailed description.

In accordance with the principles of the present invention, a wide roll of thermoplastic sheet material is cut circumferentially to form directly and without rewinding a plurality of narrower rolls. Preferably, this is done by rotating the wide roll and pressing against the surface of said roll one or more cutting units each comprising a pair of closely spaced parallel cutting edges. The narrow strip of material between the cutting edges of each pair is unwound continuously so that, as cutting progresses, a cut groove is formed in the wide roll, with each pair of cutting edges riding in its respective groove until the sheet material is cut through to the core of the roll.

The pairs of cutting edges may be advantageously mounted at the ends of lever arms so that they describe arcs in cutting through the roll of material. However, alternatively they may be supported on mountings constructed to move in other paths. Thus, the mountings may be supported on suitable guides for straight line movement so that the pairs of cutting edges travel along a true radius in relation to the roll.

This invention has been used successfully for subdividing rolls of thermoplastic film material at high speeds to produce narrower rolls of excellent uniformity and appearance.

In the accompanying drawings, wherein like numerals are employed to designate like parts throughout the same:

FIGURE 1 is a side view, taken partly in section, and showing the position of the cutting unit in the cut groove of the roll of sheet material during the cutting operation;

FIGURE 2 is a fragmentary top view of a portion of the apparatus of this invention;

FIGURE 3 is a sectional view, taken substantially along the line 3—3 of FIGURE 1, and showing a portion of the roll being cut;

FIGURE 4 is a view in cross section taken substantially along the line 4—4 of FIGURE 1;

FIGURE 5 is a bottom view of a portion of the present apparatus, showing details of construction of a guide for the cut strip;

FIGURE 6 is a side view, with portions broken away, of a modified form of cutting unit;

FIGURE 7 is a sectional view taken substantially along the line 7—7 of FIGURE 6;

FIGURE 8 is a sectional view of another modification of the cutting unit;

FIGURE 9 is a view of a further modification of the slitting apparatus shown in FIGURE 1, using another form of cutting unit and a modified construction for removing the cut strip;

FIGURE 10 is a view showing, somewhat enlarged, the details of the cutting unit used in the apparatus of FIGURE 9;

FIGURE 11 is a bottom view of the cutting unit shown in FIGURE 10;

FIGURE 12 is a cross-sectional view taken substantially along the line 12—12 of FIGURE 10 and showing the cutting unit within a cut groove of a roll of sheet material;

FIGURE 13 is a cross-sectional view taken substantially along the line 13—13 of FIGURE 9, and FIGURE 14 is a side view of a portion of a modified form of apparatus in which the cut strip is taken up and rewound.

Referring now to the drawings, and first to FIGURES 1 and 2 thereof, reference numeral 11 designates a roll formed by winding a continuous film of thermoplastic material, such as polyethylene or cellulose acetate, on a hollow cylindrical core 12 illustratively constituted of cardboard or any other suitable material. The core 12 is mounted on a driven rotatable mandrel 13 which, in the embodiment shown in the drawing, comprises a rotatably mounted horizontal center shaft 14 driven by any suitable means (not shown) supporting a sleeve 16 keyed to said shaft 14, the sleeve being longitudinally grooved to receive a plurality of flexible tubes 17. Inflation of the flexible tubes 17 causes them to expand to firmly grip the inside of the core 12 so that the roll of plastic film 11 and mandrel 13 will rotate in unison during the slitting operation now to be described.

The slitting of the roll of plastic film 11 is effected by use of a cutting unit designated generally at 18 and comprising a pair of knife blades 19 (see also FIGURE 4) disposed adjacent one end of a lever 21 which is pivoted at its other end on fixed pin means 22. A weight 23 is adjustably mounted on the lever arm 21 and serves to urge the free end of the lever arm downwardly so as to press the knife blades 19 against the roll of film 11. In the embodiments shown in FIGURES 1 to 4 the end portion of the lever arm 21 supporting the knife blades 19 is tapered so that the knife blades pressed thereagainst are inclined relative to each other at generally equal and opposite angles to the vertical with cutting edges 24 of said blades projecting outwardly on both sides, as well as downwardly. Fixed to the lower surface of the lever arm 21 between the cutting edges 24 is a "riding plate" 26 whose function will be described below. The cutting edges 24 project below the bottom of the riding plate 26 and the extent of such projection may conveniently be varied by adjustment of screw means 27 and plate means 28 which clamp the knife blades 19 to the lever arm 21. The knife blades 19 are preferably so positioned that their cutting edges 24 are exactly parallel to each other, with said edges being located in a plane which is perpendicular to the axes of the mandrel 13 and pivot pin 22, the latter in turn being exactly parallel to the axes of the mandrel 13 and roll 11.

It will be appreciated that when the roll of film 11 rotates, the edges 24 of the knife blades 19 cut continuously into the film on the roll along two spaced circumferential lines so that a strip of film material, disposed between said lines, is severed from the main body of film material on said roll. The cut strip, designated at 29 in FIGURE 1, is withdrawn continuously by any suitable means, such as by a suction device 31. Accordingly, as the roll of film 11 rotates and the cut strip 29 is removed continuously, a groove 32 is cut in the film material on the roll 11, with the knife blades 19 engaging the corners at the bottom of the cut groove. It will be understood, of course, that in order for the cut strip 29 to be removed continuously in the manner indicated, the roll of film 11 should be rotated in the direction of unwinding of the film as indicated by the arrow in FIGURE 1. Unwinding of the main body of the film material on the roll 11 during this procedure may readily be prevented by any suitable means, such as by a strip of adhesive tape 33 holding down the free end of the film.

During the cutting operation of the follower means or riding plate 26 disposed between the cutting edges 24 presses against the cut strip at the bottom of the cut groove 32. The cutting edges 24 desirably should project below the level of the riding plate distance sufficient to effect severing of one wound layer of the film material, that is, a distance greater than the thickness of the film in the case of ordinary single-wound material. For best results this distance, which may be termed "the depth of cut," should be approximately 15 times the thickness of the film so that there remains at the bottom of the cut groove 32 a number of layers of cut material acting as a reserve. Thus, if for some reason, for example unevenness or non-roundness of the roll 11, the knife blades 19 fail to cut through the film temporarily, there will be a sufficient reserve of cut strip on the roll to assure that the continuous removal thereof will be maintained during the temporary failure of cutting. It will be understood that in the usual course of uniform cutting, the knife blades 19 will advance into the roll of material 11 at the rate of one wound layer of film material per revolution, since the cut strip is necessarily unwound and removed at the rate of one layer per revolution of said roll. The exact depth of cut for optimum results will depend, however, on such factors as the toughness of the material being cut, the thickness of the film, the hardness and roundness of the roll 11, and the speed of cutting.

Each wound layer of film material may comprise more than one thickness of film. For example, in a roll of film material which has been folded double or upon itself and then wound in doubled condition, each wound layer comprises two thicknesses of film. In the cutting of such a roll according to this invention the cut strip 29 will therefore be unwound at the rate of two thicknesses of film per revolution.

Heat is generated due principally to the friction of the cutting edges 24 against the film and the rubbing of the riding plate 26 against the cut strip at the bottom of the cut groove 32. To remove this heat, and to prevent any consequent fusion or other damage to the film of thermoplastic material, a stream of coolant such as air is directed into the groove from outlet 34 of a tube 36 mounted on the lever arm 21, the tube being connected to a suitable source of air by a flexible hose 37. The lateral spacing between the knife blades 19 and the riding plate 26 permits the stream of air to come into effective contact with the mentioned parts and with the film material at the bottom of the cut groove 32. The screws 27 and plates 28 which serve to clamp the knife blades in place are so mounted that they fit easily within the cut groove 32, with a space on both sides. Accordingly, these members do not rub against the sides of the groove and the air may flow freely around them.

As is shown in FIGURE 1, the lever arm 21 and knife blades 19 are mounted in a manner such that as cutting proceeds and the knife blades penetrate deeper into the roll 11, the points of contact between the film material and the cutting edges 24 of the knife blades are shifted from the ends of the blades which are closest to the pivot shaft 22 to the opposite ends thereof. Accordingly, the entire lengths of the cutting edges 24 are employed for the cutting operation although only a relatively short portion of each cutting edge is in contact with the film material at any one time. The useful life of the knife blades 19 is thereby substantially increased. The precise position for mounting the lever arm 21 and the blades 19 to effect this result may readily be determined by appropriate graphical methods before the cutting or slitting is started.

If the shaft 14 on which the roll is mounted is driven at a constant speed, the linear speed of cutting naturally decreases as cutting proceeds. Accordingly, it is often desirable to drive the shaft 14 at a speed which increases as the diameter of the material being cut decreases so that a constant high speed of cutting is maintained.

When the apparatus embodies the riding plate 26, or other means for maintaining a fixed depth of cut, no precise control of the biasing force on the lever arm 21 is necessary and the magnitude and position of the weight 23 may be varied more or less as desired. The invention may also be practiced without the use of means for maintaining a fixed depth of cut, however, in that case the biasing force must be more carefully controlled.

The cut strip 29 in passing to the suction device 31 travels through the groove 32 cut in the roll of film 11 and then through a guide 38 which serves to twist the cut strip at an angle to its original position on the roll 11. This twisting of the cut strip, preferably by about 90°, reduces the tendency of the cut strip 29 to rub against the sides of the groove 32. As is shown in FIGURE 1, the guide 38 is mounted adjacent the roll 11 and is in a position so that it can receive easily the cut strip 29 coming from the outside of said roll at the beginning of the cutting operation as well as the cut strip removed from the inside of the roll in the final stages of cutting. More particularly, the guide 38 comprises a pair of legs 39, shown also in FIGURE 5, connected at the top 41 thereof and extending parallel along substantially their entire lengths. The inner walls of the legs 39, which define a slot 42 through which the cut strip 29 passes, are smoothly polished to permit easy travel of the cut strip along the inner walls. The free lower portions 43 of the legs 39 are desirably divergent so as to facilitate threading of the cut strip 29 into the slot 42.

Mounted at the upper portion of the guide 38 is a knife 43. In the event of accidental failure at cutting resulting in cut strip 29 being pulled, by the rotation of the roll 11, toward said roll and out of the suction device 31, the cut strip will pass over the edge of the knife 43 and be severed thereby. This will prevent the length of cut strip previously entered in the suction device from wrapping around the roll 11 and entangling the apparatus, thus the rotation of the roll 11 in the direction indicated by the arrow in FIGURE 1 will carry the cut strip 29 upward into contact with the knife 43.

The suction device 31 shown in FIGURE 1 comprises a stationary smooth-walled conduit 44 having a rounded entrance opening 46. At the entrance to the conduit 44 there is mounted a tubular ring 47 supplied with compressed air from a pipe 48 and having orifices arranged to discharge a plurality of converging streams of compressed air into the conduit 44 so as to move the cut strip 29 along the conduit toward an appropriate receptacle (not shown).

As is shown in FIGURE 1, a member 49 is mounted in the path of the lever arm 21 so as to be engaged thereby when the knife blades 19 sever the innermost layer of film material on the roll 11. This member 49 may be a simple stop or there may be employed, if desired, a microswitch connected to the driving means for the shaft 14 so as to stop said shaft when the cutting of the film material is completed. The member 49 may, however, be omitted, in which case the cutting edges 24 of the knife blades 19 will cut into the paper core 12. Since the material of the core 12 will not be removed during the cutting thereof, cutting will stop when all of the cut strip of film is removed and the riding plate 26 comes in contact with the outside of said core. After the cutting of the film ceases the lever arm 21 may be swung, manually or otherwise, away from the roll of film 11, and the core 12 may be split in any conventional manner, such as by means of a rotating saw blade (not shown) inserted into the cut groove 32 and perpendicular to the axis of the roll of film 11 while said roll of film is being rotated. The use of the mandrel 13 having the flexible tubes 17 is advantageous in this connection since it provides positive driving torque to all parts of the core 12, and will not cause damage to the saw blade when the saw blade just passes through the core. After the core 12 has been split, the flexible tubes 17 can be deflated and the two separate rolls of film formed by the cutting and splitting operations can be slipped off the mandrel 13.

The apparatus also desirably includes means for maintaining the outer corners of the cut groove 32 square, or in other words at right angles, during the cutting operation so that each of the narrower rolls resulting from the cutting will have the ends thereof straight relative to the longitudinal axis thereof. Thus, during the cutting a freely rotatable roll 51 (FIGURES 1 and 3) bridging the cut groove 32 is pressed resiliently against the roll of film 11. This overcomes the tendency for the cut edges of the film to form a ridge by spreading out at the outer surface of the roll of film 11.

As discussed above, there is friction between the rider plate 26 and the bottom of the groove 32 being cut in the roll of film 11. This is avoided in the modification illustrated in FIGURES 6 and 7, wherein the rider plate 26 is replaced by a series of freely rotatable rider rolls 53 mounted on axles 54 on lever arm 56 and arranged in a line along the length of the knife blades 19. The rider rolls 53 are spaced sufficiently closely together so that one or another of these rolls will always be in rolling contact with the bottom of the groove 32.

Another modification of the cutter construction is shown in FIGURE 8, wherein the knife blades 57 are of somewhat heavier construction and are adjustably fixed to lever arm 58 by means of clamping screws 59 and depth-adjustment screws 61. In this embodiment the air for cooling is supplied through the body of the lever arm 58 itself through a main passage 62 and discharge apertures 63. The bottom of the lever arm 58 between the blades 57 fulfills the function of maintaining the depth of cut, in the manner of the riding plate 26 of FIGURE 4.

In the modified form shown in FIGURES 9 to 12, the knife blades 66 are of the disc type and the force for urging these blades against the film material on the roll 11 is provided by a pneumatic cylinder 67 acting at one end of a lever arm 68 on which the knife blades are mounted. The lever arm 68 is pivoted on pin 69 and is formed from two side plates 71 (FIGURES 11 and 12) secured, as by rivets 72, to a center plate 73 which has a large notch 74 (FIGURES 10 and 12) to accommodate a rider wheel 76 of a cutter assembly indicated generally at 78. The side plates 71 have smaller aligned notches 79 to receive freely the hub 81 of the cutter assembly 78, with the hub being held against rotation by the engagement of pairs of locking pins 82, as appears also in FIGURES 10 and 11, with selected pairs of a series of radial holes 83 formed in the circumference of the hub. Disposed outside the side plates 71 are the knife blades 66, which preferably are annular discs having peripheral laterally projecting cutting edges 84. These blades are keyed to the hub 81 by a pin 86 (FIGURE 12) and are held on the hub by the enlarged heads 87 of screws 88, while the rider wheel 76, whose function is similar to that of the rider plate 26 of FIGURE 4 and the rider wheels 53 of FIGURES 6 and 7, is mounted for free rotation on the hub 21 between the side plates 71.

It will be appreciated that the cutting operation using the embodiment shown in FIGURES 9 to 12 is carried out in substantially the same manner as that described in connection with FIGURE 1, although, as will be described further hereinafter, different means are employed for the removal of the cut strip 29. In any event, as cutting proceeds and the diameter of the material at the point of cutting decreases, the points at which the cutting edges 84 of the blades 66 make contact with the film material shift along the periphery of the blades in a manner similar to that described in connection with the straight blades 19 used in the embodiment shown in FIGURE 1. When the cutting edges 84 become dull or nicked on repeated use, the blades 66 can be rotated through any desired angle to expose fresh cutting edges. This may be done by pulling the locking pins 82, against the force of their leaf springs 89, out of the holes 83 in the hub 81 of the cutter assembly 78, then rotating the hub 81 and the knife blades 66 keyed thereto, and then allowing the locking pins 82 to engage in a different pair of holes 83. When an entire cutting edge 84 becomes dull the blades 66 can, of course, be removed and resharpened by grinding. In this case the diameters of the blades 66 will be decreased by the grinding operation and a riding wheel 76 of correspondingly lesser diameter should be employed in order to maintain the desired depth of cut.

Instead of using a blast of compressed air for cooling the cutting area, a flow of air over this area may be produced by providing the riding wheel 76 with integral vanes 91 (see FIGURES 10 and 11) for moving the air from one side of the wheel to the other. To facilitate the flow of air the side plates 71 may be provided with a number of ventilating holes 92, as is shown in FIGURES 10 and 12.

For ease of construction the blades 66 are mounted parallel to each other and to the lever arm 68, however, it will be appreciated that they can be mounted at an angle so as to diverge at the bottom of the cut groove 32 and converge at the top.

Optimum results are obtained when the operative portions of the cutting edges 84 of the disc type knife blades 66 are perpendicular to the axis of rotation of the roll of film 11 so that the cutting assembly can move freely in the groove 32 cut in said roll. For this purpose, parallelism between the axis of the pivot 69 (FIGURE 9) and the axis of rotation of the roll 11 is preferred.

The use of disc-type knife blades 66 has advantages over the straight blades 19 shown in FIGURE 1 in that, due to the relatively small radius of curvature of the cutting edges of the disc-type blades, they have a greater tendency to produce a continuous cut even when the surface of the film being cut is uneven or wrinkled and has depressions which may be missed in a single passage of the straight blades over the uneven surface.

The removal of the cut strip 29 in the embodiment shown in FIGURE 9 is effected by means of a thin roll 93 (see also FIGURE 13), hereinafter designated as a stripping wheel, which is of lesser thickness than the width of the cut groove 32. The surface of this stripping wheel 93 is covered with a material of high coefficient of friction such as rubber 94. The stripping wheel 93 is mounted for free rotation on an axle 96 at one end of an arm 97, pivoted on a pin 98, the positions of the parts being such that the wheel 93 fits within the cut groove 32 and is pressed against the bottom of said groove by a pinch roll 99, similarly mounted for free rotation on an axle 101 at the end of a bell crank 102 pivoted, like the arm 97, on the pin 98. An adjustably mounted weight 103 serves to bias the bell crank 102 so as to urge the pinch roll 99 toward the surface of the stripping wheel 93. Preferably, the axles 96 and 101 of the stripping wheel 93 and pinch roll 99, respectively, are mounted at points about equidistant from the pivot pin. The stripping wheel 93 is driven by its frictional engagement with the bottom of the cut groove 32 of the rotating roll of film 11, and it in turn drives the pinch roll 99. It will be apparent that with this arrangement the peripheral speeds of the stripping wheel 93 and the pinch wheel 99 will necessarily be equal to the linear speed at which the cut strip 29 is to be removed. The cut strip 29 passes on to the rubber surface 94 of the stripping wheel and the pinch roll 99, and next to a suitable collector such as a suction device 106.

In order to assure that the cut strip 29 leaves the nip between the stripping wheel 93 and the pinch roll 99 without wrapping around either of these two rotating members, the stripping wheel and pinch roll are provided with narrow central circumferential grooves 107 and 108, respectively (FIGURE 13), in which are received the ends of narrow spring fingers 109 and 111, respectively, which have a thickness less than the depth of said grooves mounted, respectively, on the arm 97 and on a suitable support 112. The spring fingers 109 and 111 which extend into the nip between the stripping wheel and the pinch roll are adapted to urge the cut strip 29 away from the rotating surfaces and to act as guards to keep the strip leaving the nip from re-engaging the stripping wheel 93 or the pinch roll 99.

If desired, the cut strip may be rewound directly as it is removed, in the manner illustrated in FIGURE 14. In this case pinch wheel 99 is replaced by freely rotatable hub 113 mounted on the axle 101 and adapted to support a suitable core 114 on which the cut strip is wound continuously in the form of a roll 116.

It will be appreciated that for best results in the embodiments shown in FIGURES 9, 13 and 14 the axles 96 and 101 and the pin 98 are parallel to the axis of rotation of the roll of film 11. Also, the radius of the stripping wheel 93 should be sufficiently large to enable this wheel to enter the full depth of the cut groove 32 in the roll of film, down to the core 12, without the arm 97 engaging said roll of film.

While the above detailed description has dealt with the use of a single cutting unit so as to produce two narrower rolls of sheet material from each wider roll, it will be appreciated that depending on the width of the original roll any suitable number of cutting units may be used simultaneously, or successively, and in parallel to produce a corresponding number of narrower rolls and of cut strips.

It is to be understood that the foregoing detailed description is given merely by way of illustration and that many variations may be made therein without departing from the spirit of the present invention.

The embodiments of the invention in which an exclusive property or privilege is claimed are defined as follows:

1. Apparatus for coating a wound roll of sheet material on a core to produce therefrom without rewinding a plurality of narrower wound rolls of said sheet material, which comprises a cutter support, a cutter assembly comprising a pair of narrowly spaced cutters on said support and providing a pair of parallel severing surfaces for cutting circumferentially a narrow strip of said sheet material from said rolls intermediate the opposite ends thereof, a driven mandrel for rotating said roll about its axis, means for continuously unwinding said cut strip from said roll during the cutting of said strip while the sheet material adjacent to said cut strip is maintained in wound condition on both sides of said strip to form a plurality of wound rolls of sheet material separated from each other by a narrow groove the edge portions of which are contacted by said severing surfaces, said groove being just wide enough to permit access to said cutter support and cutters to the interior of said wound roll, the width of said support and cutters being less than the width of said groove so that said cutters are at all times spaced from the side walls of said groove, and means for applying pressure to the cutter corners of the material bounding said cut groove for maintaining them substantially square.

2. Apparatus for cutting a wound roll of sheet material on a core to produce therefrom, without rewinding, a plurality of narrower wound rolls of said sheet material, which comprises a cutter support, a cutter assembly comprising a pair of narrowly spaced cutters on said support and providing a pair of parallel severing surfaces for cutting circumferentially a narrow strip of said sheet material from said roll intermediate the opposite ends thereof, means for rotating said roll about its axis, and means for continuously unwinding said cut strip from said roll during the cutting of said strip while the sheet material adjacent to said cut strip is maintained in wound condition on both sides of said strip to form a plurality of wound rolls of sheet material separated from each other by a narrow groove the edge portions of which are contacted by said severing surfaces, said groove being just wide enough to permit access of said cutter support and cutters to the interior of said wound roll the width of said support and cutters being less than the width of said groove so that said cutters are at all times spaced from the side walls of said groove, a wheel adapted to be received within said groove in contact with the cut strip being unwound at the bottom of said groove, and means for drawing said cut strip out of said groove over said wheel.

References Cited by the Examiner

UNITED STATES PATENTS

| | | | |
|---|---|---|---|
| 341,895 | 5/1886 | Edmunds | 83—100 |
| 929,679 | 8/1909 | Lorenz | 82—47 |
| 1,383,133 | 6/1921 | Lucke | 83—102 |
| 1,748,474 | 2/1930 | Grauert | 82—100 |
| 2,015,877 | 10/1935 | Thompson | 83—665 |
| 2,711,863 | 6/1955 | Grettve | 82—44 X |
| 2,755,029 | 7/1956 | Speed et al. | 242—55 |
| 3,107,564 | 10/1963 | Coker et al. | 82—101 |
| 3,118,333 | 1/1964 | Pilcher et al. | 82—47 |

FOREIGN PATENTS

| | | |
|---|---|---|
| 1,047,389 | 12/1953 | France. |
| 303,958 | 7/1917 | Germany. |
| 553,524 | 5/1943 | Great Britain. |

WILLIAM W. DYER, JR., *Primary Examiner.*

LEON PEAR, *Examiner.*